Dec. 26, 1961    N. NEBOUT    3,014,831
TIRE BUILDING MACHINE
Filed Oct. 27, 1955    3 Sheets-Sheet 1
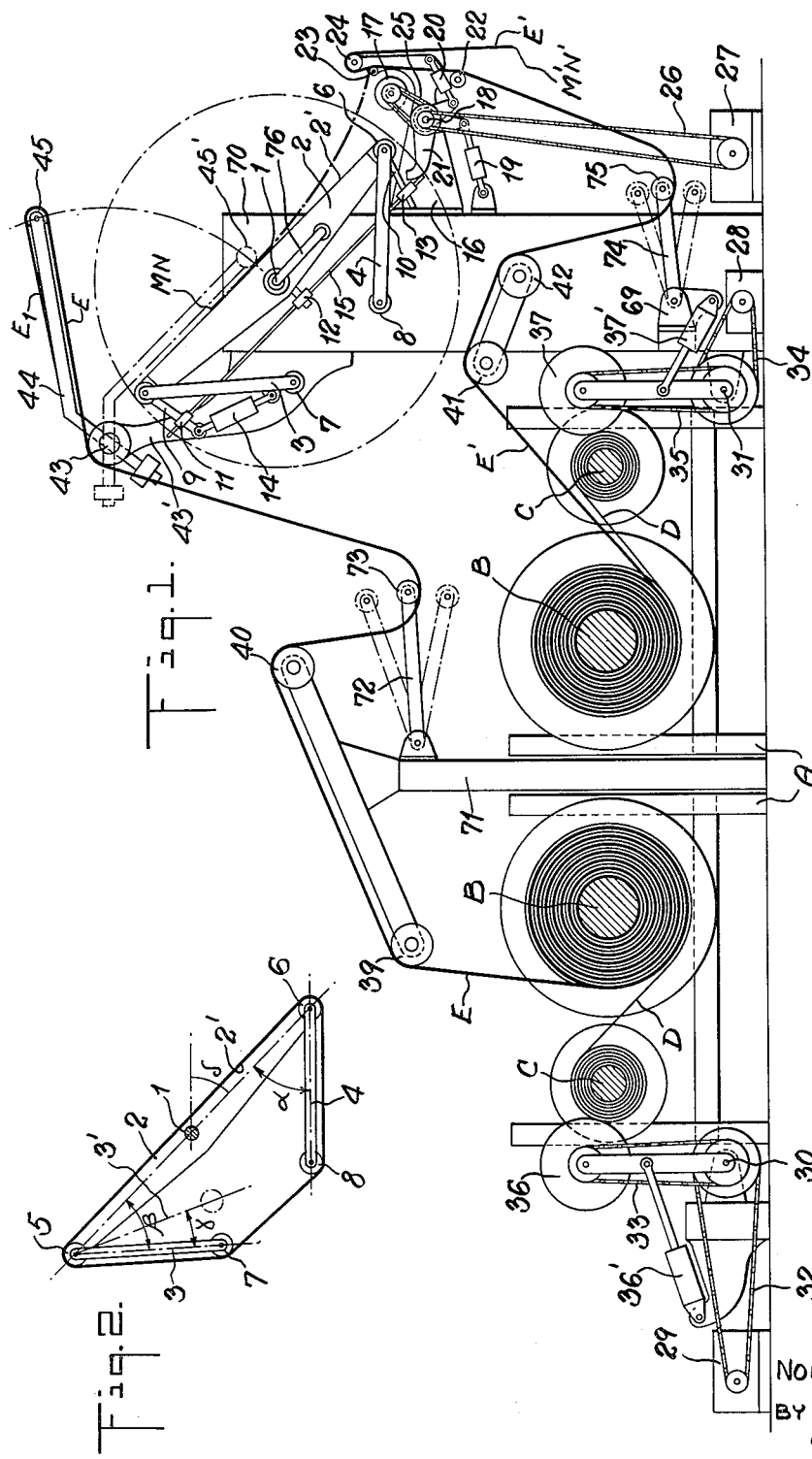
INVENTOR.
NOEL NEBOUT
BY Benj. T. Rauber
ATTORNEY

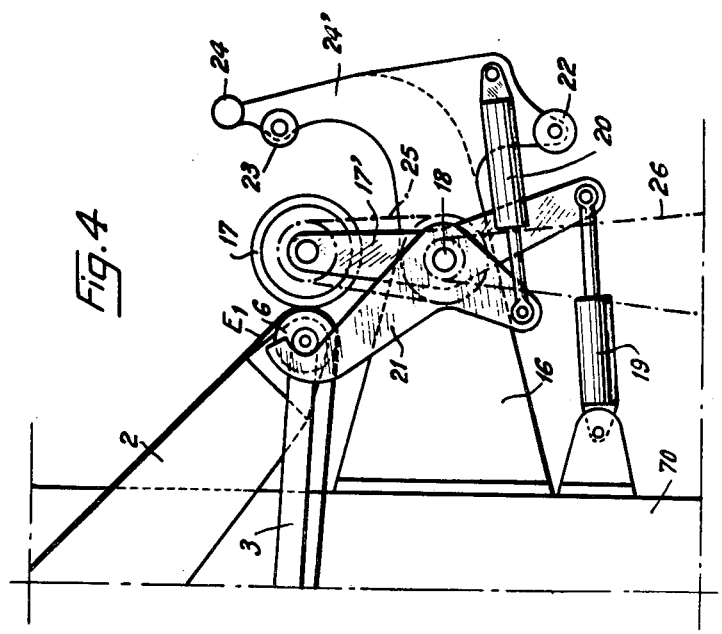
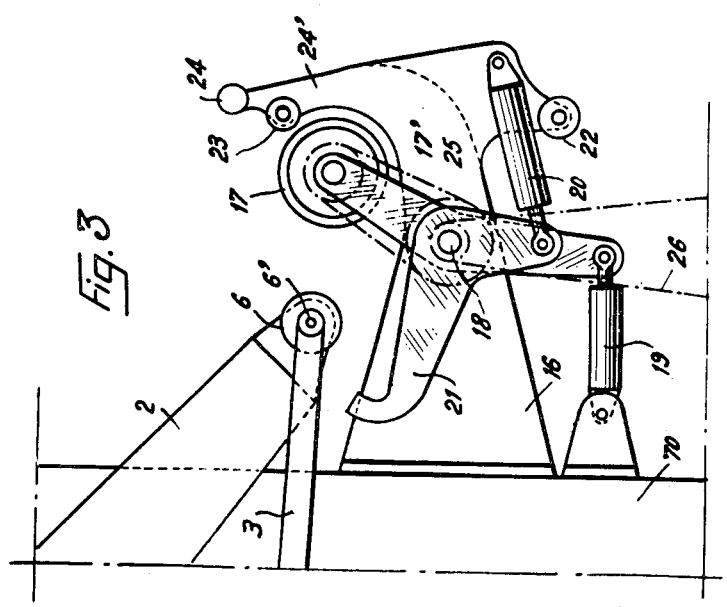

Dec. 26, 1961 N. NEBOUT 3,014,831
TIRE BUILDING MACHINE
Filed Oct. 27, 1955 3 Sheets-Sheet 3
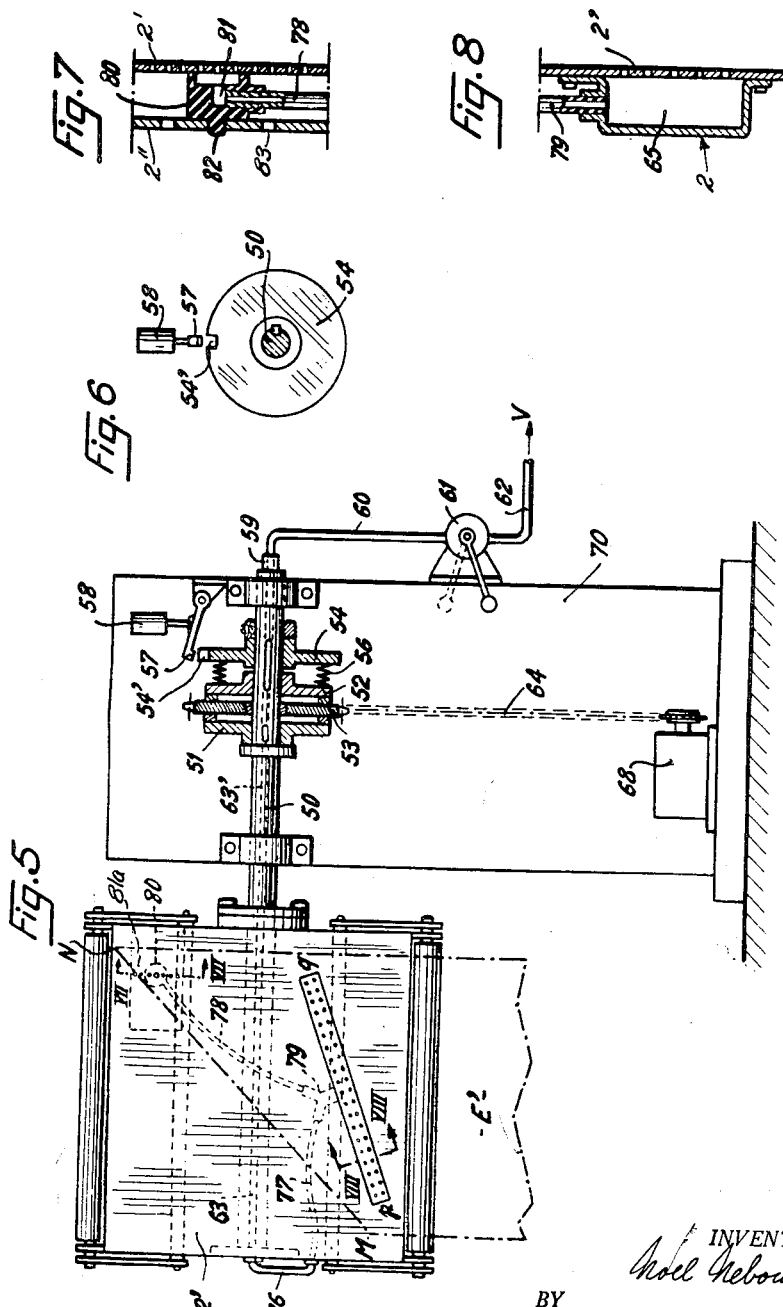
INVENTOR.
Noel Nebout
BY Benj. T. Rauber
his attorney

United States Patent Office 3,014,831
Patented Dec. 26, 1961

3,014,831
TIRE BUILDING MACHINE
Noel Nebout, Montlucon, Allier, France, assignor to Dunlop Tire and Rubber Corporation, Buffalo, N.Y., a corporation of New York
Filed Oct. 27, 1955, Ser. No. 543,100
Claims priority, application France Mar. 25, 1955
15 Claims. (Cl. 156—406)

My invention relates to a machine for forming a tire carcass from plies of rubberized fabric, said machine having a forming element adjustable to form carcasses of different perimeters or circumferences.

Heretofore tire carcasses have been formed by wrapping plies of rubberized fabric on a cylindrical former of a diameter and circumference corresponding to the diameter of the tire to be formed. This required a former for each size of tire.

My invention provides a tire forming machine in which tires of several different diameters may be made accurately on a single former adjustable to the winding of carcasses of different diameters or circumferences. In the former of my invention the plies are wound in the form of sides of a polygon which may then be re-shaped to a cylindrical shape and then to an annular tire shape.

The former comprises a table having a pair of parallel edges, a support to mount said table rotatably on an axis parallel to said parallel edges and one or more wings mounted on said table to tilt on an axis parallel to said parallel edges of said table and having an edge spaced from the axis of tilting of said wing and parallel with the said parallel edges of said table to define one plane of a polygon. The spaced edge of said wing or wings lies in a plane parallel with each of the parallel edges of the table and may define with one of said edges a plane of the polygon. The table has a surface to which an end of a fabric ply may be attached in such manner that when the table is rotated a complete revolution the ply will be wound about the parallel edges of the table and wing assembly to form a polygon open at its ends. Successive plies may be wound in this manner. The perimeter of the structure thus formed may be accurately adjusted by adjustment of the dihedral angle of the wing or wings with the plane of the table. The wing or wings may be of any form or construction that provides the parallel edge spaced from the axis of tilting of the wing on the table. Each wing is preferably, though not necessarily, mounted on or at one of the parallel edges of the table.

To enable successive plies to be compacted together, rollers are mounted at the parallel edges of the table and wing or wings so that the fabric plies are wound about these rollers. When plies are to be compacted the leading edge of the innermost ply is detached from the table so that the ply assembly may rotate about the rollers as a unit and be compacted together by a driving roller pressed against the plies at one of the rollers of the assembly.

Suitable means are also provided for supplying rubberized fabric to the former and for stopping the rotation of the former at each complete rotation. The stopping means may be controlled automatically.

The description which follows with reference to the accompanying drawings, given by way of non-limiting example, will make clear how the invention may be carried out, the details which emerge from the text as well as those from the drawings, forming, it is understood, part of the said invention.

FIG. 1 is a schematic elevation of the machine assembly;

FIG. 2 is a diagram explaining the operation of the deformable quadrilateral which constitutes the rotary support;

FIG. 3 and FIG. 4 show the mechanism for bonding the rubber plies in the waiting position and in the active position respectively;

FIG. 5 is a partial elevation of the machine showing the suction device as well as the driving mechanism for the rotary support;

FIG. 6 shows a detail of this mechanism;

FIGS. 7 and 8 are sections along VII—VII and VIII—VIII of FIG. 5.

In the method of carrying out the invention shown in the drawing, there is seen at 1, FIGS. 1 and 2, the axis of rotation of a rectangular table 2 turning on a frame 70 and having a flat work surface 2'. On the opposite sides of the table, parallel to the axis of rotation, are articulated the wings 3 and 4, which are also rectangular. The loose rollers 5 and 6 are mounted on the axes of articulation of the wings 3 and 4 and the table 1, and two other loose rollers 7 and 8 are provided on the opposite free sides of the wings. These four rollers 5, 6, 7, 8, constitute the four apices of a deformable quadrilateral (see particularly FIG. 2) the perimeter of which varies according to the angular position of the wings 3 and 4 with respect to the table 2.

The angular position of the wings is controlled, in the example shown in FIG. 1, by means of a lead screw 15 supported at 12 and controlling, by the pivoting nuts 11 and 13, the orientation of the levers 9 and 10 associated with the wings 3 and 4 respectively. While the lever 10 is fixed with respect to the wing 4, the lever 9 may pivot about the axis of articulation of the wing 3, but it is fixed to it by a pneumatic jack 14. The lever, lead screw and jack may for convenience be at one side of the table 2 and wings 3 and 4.

The assembly formed by the table 2 and the articulated wings 3 and 4 forms a support turning about the horizontal axis 1; the size of this support, which is equal to the perimeter of the quadrilateral 5, 6, 7, 8, may be varied by inclining the wings 3 and 4 more or less with respect to the table 2, by means of the control device 9—15. This device allows the angle $\alpha$ formed by the wing 4 with the table 2 and the angle $\beta$ formed by the wing 3 with the table 2 to be varied. Moreover, the pneumatic jack 14 allows the wing 3 to be pivoted with respect to the lever 9 to bring this wing into position 3' shown in broken lines on FIG. 2, thus reducing the angle $\alpha$ by the quantity $\gamma$, which brings about a corresponding reduction in the perimeter of the deformable quadrilateral. The object of this momentary reduction in the size of the support will be explained later.

As is shown more clearly in FIGS. 5 and 6, the rotary support which has just been described is driven by a motor 68 carried by the frame 70 and acting, through the chain 64, on a toothed wheel 53 of a friction clutch comprising two plates 51, 52 keyed to a shaft 50 and located on both sides of the toothed plate 53 which is loosely mounted on this shaft. The springs 56 bearing on a plate 54 fixed to the shaft 50 press the plates 51, 52, 53, against each other so as to achieve driving by friction from the driving plate 53.

The plate 54 fixed to the shaft 50 carries at its periphery a notch or slot 54' (see particularly FIG. 6) in which a latch 57 controlled by the electro-magnet 58 may engage thus forming a latch to prevent rotation of the shaft 50.

The driving device for the rotary support operates in the following manner:

The reduction-geared motor 68 drives the driving plate 53 of the friction clutch. The movement is transmitted to the shaft 50, always provided that the plate 54 is not locked by the latch 57 engaging in the slot 54'. In other words, the shaft 50 can only turn if the electro-magnet 58 receives an exciting impulse, raising the latch 57 and freeing the plate 54. The excitation of the electro-magnet 58 ceases an instant later, and the latch 57 falls back onto the periphery of the plate 54 but does not hamper the rotation of the latter. When the latter has made a complete turn, the slot 54' regains its original position opposite the latch 57 which then comes into engagement with this slot, thus stopping the movement of the support and limiting its rotation to one complete turn.

The position of the slot 54' is determined in such a way that on stopping, the table 2 is in a plane inclined to the horizontal by an angle δ, in the manner of a desk, in order to facilitate the work of the operator.

According to one of the important characteristics of the invention, the table 2 is provided with a suction device (FIGS. 5, 7, and 8).

The pipe 62 opening out into the vacuum pump V, not shown, is connected to an axial channel 63' provided in the shaft 50 and extending via a channel 63 into the inside of the table 2, and the junction of the pipe-system 60—62, controlled by the tap 61, with the channel 63—63', is achieved by an airtight rotary joint 59.

The working surface 2' of the table 2 is provided with two suction zones, one inclined portion $pq$ (the section of which is shown in FIG. 8) is provided with a large number of small holes communicating with a chamber 65 located in the thickness of the table 2 and opening out into the surface 2' of the latter. The chamber 65 is connected with the vacuum system by means of connector 79 and piping 77—76, one branch of the connector 79 opening out into a second zone, via a tube 78.

This second zone comprises a mobile suction cap 80 placed on the under side of the plate 2' of the table 2 and to be moved to register with one or more of openings 81a arranged in a series transverse to the axis of rotation of the table. FIG. 7 shows the section of this cap 80, which is of elastic material for example rubber and carries a teat 82 which may be engaged selectively in one of a series of spaced holes 83 in a plate 2'' spaced opposite the under side of the plate 2'. The edge of the cap seals against the inside surfaces of the plate 2'. This provides suction only in the zone of the movable cap 80, the chamber 81 of which is connected, by means of the flexible tube 78, to the vacuum system.

As shown in FIGS. 1, 3 and 4, there is mounted on a support 16 fixed to the frame 70, the "rolling" mechanism for bonding the plies of rubberized fabric together. About an axis 18 mounted on a bracket 16 there pivots a fork 17' carrying a roller 17 covered with an elastic material such as rubber and being rotated by means of the chains 25 and 26 controlled by the reduction-geared motor group 27 (see FIG. 1).

The roller 17 can be applied against the roller 6 of the support by swinging the assembly 17—17' by means of a jack 19.

On the other side, a hook 21, pivoted to the axis 18, retains the end 6' of the axle of the roller 6 at an inclination δ, FIG. 2, when the table 2 is in the stopped position, to allow the table 2 to sustain without flexing the pressure exercised by the roller 17. A jack 20 actuates the hook 21.

A fixed bar 24 placed on the arm 24' in front of the table 2 allows the band of rubberized fabric E', FIG. 1, to be maintained in the waiting position. The loose rollers 22 and 23 assist the circulation of the band E'.

Above the rotary support there is a lever 44 articulated at 43 to a fixed support 43' and provided with a bar 45 on which rests a second band of rubberized fabric E folded back at E¹. The hollow bar 45 may be pierced with small holes in its middle part and connected by a flexible pipe to a suction pump by means of a three-way tap.

The two bands of rubberized fabric E and E' are supplied from two bobbins such as B carried by the removable supports A. These bands E, E' are wound with intermediate layers D in order to prevent sticking of the turns of the rubberized fabric, and these intermediate layers are wound onto rollers C under the action of the movable rollers 36 and 37 articulated at 30 and 31 and bearing on the intermediate fabric wound on these axes. The jacks 36' and 37' ensure the application of the rollers 36 and 37, the rotation of which is controlled respectively by reduction-geared motor groups 29 and 28 which drive the chain transmissions 32 and 33 for the one, 34 and 35 for the other.

The fabrics E and E' pass respectively over the rollers 39 and 40 and 41 and 42, the rotation of these rollers being, moreover, controlled by the motors 29 and 28.

The fabric bands E and E' which are brought to the rotary support comprise slack lengths the level of which is controlled by the rollers 73 and 75 carried by the levers 72 and 74 pivoted on the fixed supports 71 and 69. The levers 72 and 74 act in a known manner on the motors 29 and 28 to control their speed. Thus an intake of the fabric causes a reduction in the slack of the band and thus raising of the lever 72 or 74, according to the case, and an acceleration of the corresponding motor; on the contrary, an increase in the slack results in a slowing down or stopping of the band of fabric, bringing about a slowing down or stopping of the motor in question.

The production of elements of rubberized fabric for the manufacture of pneumatic tire covers by means of the machine which has just been described takes place in the following manner:

Referring to FIG. 1, the band of fabric E' is passed over the rollers 22 and 23 and the fixed bar 24 and its end is left hanging freely at M'N'.

When it is desired to wind the fabric onto the rotary support, the hanging part of the band E' is folded back onto the inclined surface 2' of the table 2, and the end of this band, cut with a certain bias along MN, is applied to this surface (see FIG. 5). The bias angle of the end of the band E' is such that the latter covers the two suction zones $pq$ and 80, the position of the suction cap 80 being accurately chosen in relation to the position of the point N of the end of the band E'.

The end of the fabric having been placed at MN on the table 2', the tap 61 is opened; this end is thus submitted to strong suction and adheres to the table 2, along the length of the band $pq$ and at the level of the cap 80. For lower or higher bias angles, the cap 80 is displaced in one direction or the other so that the corresponding suction zone will be covered by the fabric. For very low bias angles, the suction zone $pq$ alone may be sufficient.

The motor 68 is then put into motion, unlocking 57. The table rotates by one turn as has been described above, and the motor 68 stops when the latch 57 falls back into the slot 54' of the plate 54. The band of fabric E' has thus made a complete turn about the rotary support. The fabric is torn off in the region MN and is folded back round the fixed bar 24 at M'N', in the waiting position. The two ends of the fabric are bonded together so as to form an endless band wound about the deformable quadrilateral formed by the rotary support, and the tap 61 is closed, thus freeing this band.

The fabric E is then placed on this endless band by swinging the lever 44, thus making the roller of the end 45 come to the position 45'. The length E¹ is brought up to the level of the roller 6 and the jack 19 is actuated so that the bonding roller 17 exercises a strong pressure on the fabric E¹ (see FIGS. 3 and 4) and bonds this to the fabric E' located beneath it. The motor 27 is then put into motion and rotates the roller 17, which in its turn unwinds the band E' onto the loose rollers 5, 6, 7 and 8 gradually bonding the fabric E to the fabric E'.

After a complete turn the fabric E is torn off to separate the part which has just been bonded, and the lever 44 is raised.

During the whole of this bonding operation, the hook 21 is placed in the active position of supporting the shaft 6', by means of the jack 20, as has been described already.

At the end of these operations of superposing and bonding the fabric bands, the cover or "pocket" formed on the rotary support must be removed from the latter. To facilitate the removal of this pocket, the jack 14, which bears on the one hand on the lever 9 and on the other on the wing 3, is actuated to bring the latter against the table 2, thus reducing the angle β between this wing and this table by an amount γ (see FIG. 2). As has been shown above, this has the effect of reducing the perimeter of the quadrilateral 5, 6, 7, 8, and the pocket no longer being held on the four rollers forming the apices of the quadrilateral, it may be removed laterally from the support, that is to say, perpendicular to the plane of FIG. 1, or towards the left looking at FIG. 5. This removal may be carried out manually, or preferably mechanically, with the aid of suitable gripping apparatus.

It is to be understood that modifications may be made to the methods of carrying out the invention which have been described, notably by the substitution of equivalent technical means, without departing from the scope of the invention.

In particular, it is obvious that in place of a deformable quadrilateral such as that shown in the drawing, any other sort of deformable polygon, notably a triangle, may be used; it is sufficient in this case to have only one articulated wing instead of two, and consequently to adapt the device controlling the angular position of this wing with respect to the table.

Furthermore, one or more of the flat rectangular elements 2, 3, 4 may be replaced by elements of different shape, and notably by concave elements, the rotary support thus having the appearance of a curvilinear polygon.

It is also possible to provide the machine with more than two fabric supply bobbins, providing each of these with a slack control length as described above.

Having described my invention, what I claim is:

1. Apparatus for forming superposed bands of rubberized fabric which comprises a table having a pair of parallel edges and a forming surface between said parallel edges to receive and support an end portion of rubberized fabric, means rotatably supporting said table on an axis parallel to said parallel edges of said table, at least one wing tiltably mounted on said table to swing on an axis parallel to said parallel edges to adjustable positions relative to the plane of the said parallel edges of said table and having an edge spaced from and parallel with the parallel edges of said table so that each of said parallel edges of said table taken separately lies in a plane common with said parallel edge of said wing so that a fabric wound about said parallel edges of said table and wing assembly form a polyhedral band, means to secure said wing in adjusted position, means for securing a leading edge of a sheet of rubberized fabric to said table and means to rotate said table and wing assembly on said axis to wrap a sheet of rubberized fabric secured at a leading edge to said table from one of said parallel edges of said table and wing assembly to a succeeding edge and to said leading edge of said fabric to form a polyhedral band.

2. The apparatus of claim 1 having a fabric supply means extending above said table and a support for the free end of said fabric hinged to swing downwardly to said table.

3. The apparatus of claim 1 having rollers supported at the edges of said table parallel to said axis of rotation and at the free edge of the wing over which said fabric is wound, releasable means for locking said table from rotation, a rotatable pressure roller movable to press against one roller at a side edge of said table, means for supplying a second fabric to the first fabric on said table and means to rotate said pressure roller to press said second fabric onto said first fabric and to rotate said fabrics about the rollers on said table and wing to draw the second fabric as a layer onto the first fabric.

4. The apparatus of claim 1 having two wings, one hinged to one side edge of the table and the other hinged to the opposite side edge.

5. The apparatus of claim 1 having means for supporting rolls of fabric disposed with their axes of rotation parallel to that of the element and means for rotating said rolls to supply fabric to the element.

6. The apparatus of claim 1 having a latch positioned to engage and hold said table in one position of its rotation and means to disengage said latch from said table and permit it to rotate to said position for re-engagement of said latch.

7. The apparatus of claim 6 having an electro magnet to disengage said latch.

8. The apparatus of claim 1 in which said means for securing the leading edge of fabric to said table comprises a suction conduit attached to said table and opening to said forming surface.

9. The apparatus of claim 8 in which said suction conduit is adjustable to adjust the position of its opening to said forming surface.

10. The apparatus of claim 1 having rollers mounted at the parallel edges of said table and wing assembly.

11. The apparatus of claim 1 in which said means to rotate said table comprises a rotatable shaft on which said table is rigidly mounted, a notched disc mounted on said shaft to rotate therewith, a latch position to engage in said notch, an electromagnet to disengage said latch from said shaft to permit rotation thereof and release said latch to engage said notch on completion of a rotation of said table.

12. The apparatus of claim 1 in which said means to rotate said table and wing assembly is reversible to rotate said assembly in opposite direction and a roller at each of said parallel edges of said assembly, a pressure roller movable to press against fabric on one of said rollers of said assembly to drive a band of fabric on said assembly about said assembly.

13. The apparatus of claim 12 having means to supply rubberized fabric to said table from opposite directions.

14. The apparatus of claim 1 having a pair of wings one mounted near one of the parallel edges of the table and the other near the other of said parallel edges.

15. The apparatus of claim 8 in which the table is provided with a plurality of holes leading from the surface thereof to said suction conduit for creating a partial vacuum beneath the leading edge of a sheet of fabric applied to the table to attach it thereto.

References Cited in the file of this patent

UNITED STATES PATENTS

| 1,516,290 | Grove | Nov. 18, 1924 |
| 1,665,194 | Sterens | Apr. 3, 1928 |
| 2,501,644 | Kraft et al. | Mar. 21, 1950 |
| 2,588,207 | Cleland et al. | Mar. 4, 1952 |
| 2,645,270 | Speed et al. | July 14, 1953 |

FOREIGN PATENTS

| 218,055 | Great Britain | July 3, 1924 |
| 117,647 | Australia | Oct. 19, 1943 |